(12) United States Patent
Kim et al.

(10) Patent No.: US 7,357,722 B2
(45) Date of Patent: Apr. 15, 2008

(54) VARIABLE DAMPER

(75) Inventors: Young Heub Kim, Seoul (KR); Dong Hoon Park, Seongnam (KR)

(73) Assignee: Hyundai Motor Company, Seoul (KR)

( * ) Notice: Subject to any disclaimer, the term of this patent is extended or adjusted under 35 U.S.C. 154(b) by 168 days.

(21) Appl. No.: 11/305,716

(22) Filed: Dec. 15, 2005

(65) Prior Publication Data

US 2006/0135268 A1  Jun. 22, 2006

(30) Foreign Application Priority Data

Dec. 22, 2004  (KR) .................. 10-2004-0110554

(51) Int. Cl.
*F16F 15/129* (2006.01)
(52) U.S. Cl. .................... 464/68.2; 464/68.4
(58) Field of Classification Search ........... 464/68.2, 464/68.4, 68.41; 192/201, 214, 214.1
See application file for complete search history.

(56) References Cited

U.S. PATENT DOCUMENTS 4,638,684 A * 1/1987 Maucher ............... 464/68.2
5,713,442 A * 2/1998 Murata et al.

* cited by examiner

*Primary Examiner*—Greg Binda
(74) *Attorney, Agent, or Firm*—Morgan Lewis & Bockius LLP

(57) ABSTRACT

A variable damper includes a first plate connected to a first rotating shaft and a second plate connected to a second rotating shaft. A damper spring transmits power between the first and second plates, and a variable friction apparatus regulates a frictional force between the first and second plates. The variable friction apparatus includes a solenoid coil, a solenoid pawl, a pressure plate with a slanted surface, a friction plate between the pressure plate and the second plate, a wedge contacting the pressure plate and movable along the slanted surface in response to the state of the solenoid pawl, and a wedge spring supporting the wedge.

4 Claims, 5 Drawing Sheets

VARIABLE DAMPER

CROSS-REFERENCE TO RELATED APPLICATION

This application claims priority to and the benefit of Korean Patent Application No. 10-2004-0110554 filed in the Korean Intellectual Property Office on Dec. 22, 2004, the entire contents of which are incorporated herein by reference.

BACKGROUND OF THE INVENTION

1. Field of the Invention

The present invention relates to an apparatus for transmitting power. More particularly, the present invention relates to a variable damper that can variably regulate a power delivery characteristic between rotating bodies.

2. Description of the Related Art

Generally, a clutch disk utilized in a manual transmission includes a retaining plate, a driven plate, and a coulomb damper. The coulomb damper includes one or two friction discs and a pre-load spring applying a vertical load to a friction plate. The coulomb damper generates a constant hysteresis torque regardless of a twist angle of the damper. That is, a value of the hysteresis torque is constantly maintained regardless of an input sympathetic frequency or a vibration characteristic.

If the value of the hysteresis torque of the damper is small, a sympathetic phenomenon excessively occurs in a driving system and if the value of the hysteresis torque of the damper is big, a problem occurs that a transmission rate increases in a range of a high-numbered revolution.

That is, the hysteresis affects a vibration of the vehicle, for example, in a case where the sympathetic frequency of the engine is in resonance, an excessive booming noise occurs in the vehicle.

In this case, if the value of the hysteresis is big, the frequency of the engine can pass through a range of the resonance. However, in a case that the value of the hysteresis is in a normal running state, a problem occurs that an efficiency of the driving system is reduced.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a variable damper having advantages of variably regulating a power delivery characteristic between rotating bodies. An exemplary variable damper transmitting power between a first rotating shaft and a second rotating shaft according to an embodiment of the present invention may include a first plate connected to the first rotating shaft to rotate together with the first rotating shaft, a second plate connected to the second rotating shaft to rotate together with the second rotating shaft as an integral body, a damper spring transmitting power between the first and the second plates by being pressed by relative rotation between the first and the second plates, and a variable friction apparatus variably regulating a frictional force between the first plate and the second plate. The variable friction apparatus may include a solenoid unit operating as an electromagnet by power supplied from outside, and a friction unit variably forming a frictional force between the first plate and the second plate corresponding to a state of the solenoid unit. The friction unit may include a pressure plate forming a slanted surface, a friction plate disposed between the pressure plate and the second plate to contact the second plate, a wedge contacting the pressure plate to be movable along the slanted surface corresponding to the state of the solenoid unit, and an elastic member elastically supporting the wedge in a direction toward the pressure plate and the first plate. The wedge may move in a direction pressing the elastic member when the solenoid unit is in the "on" state. The elastic member may include a wave spring. The solenoid unit may include a solenoid coil generating a magnetic force by the supplied power and a solenoid pawl operating as the electromagnet by the magnetic force.

DETAILED DESCRIPTION OF THE EMBODIMENTS

An exemplary embodiment of the present invention will hereinafter be described in detail with reference to the accompanying drawings.

Figure 1:
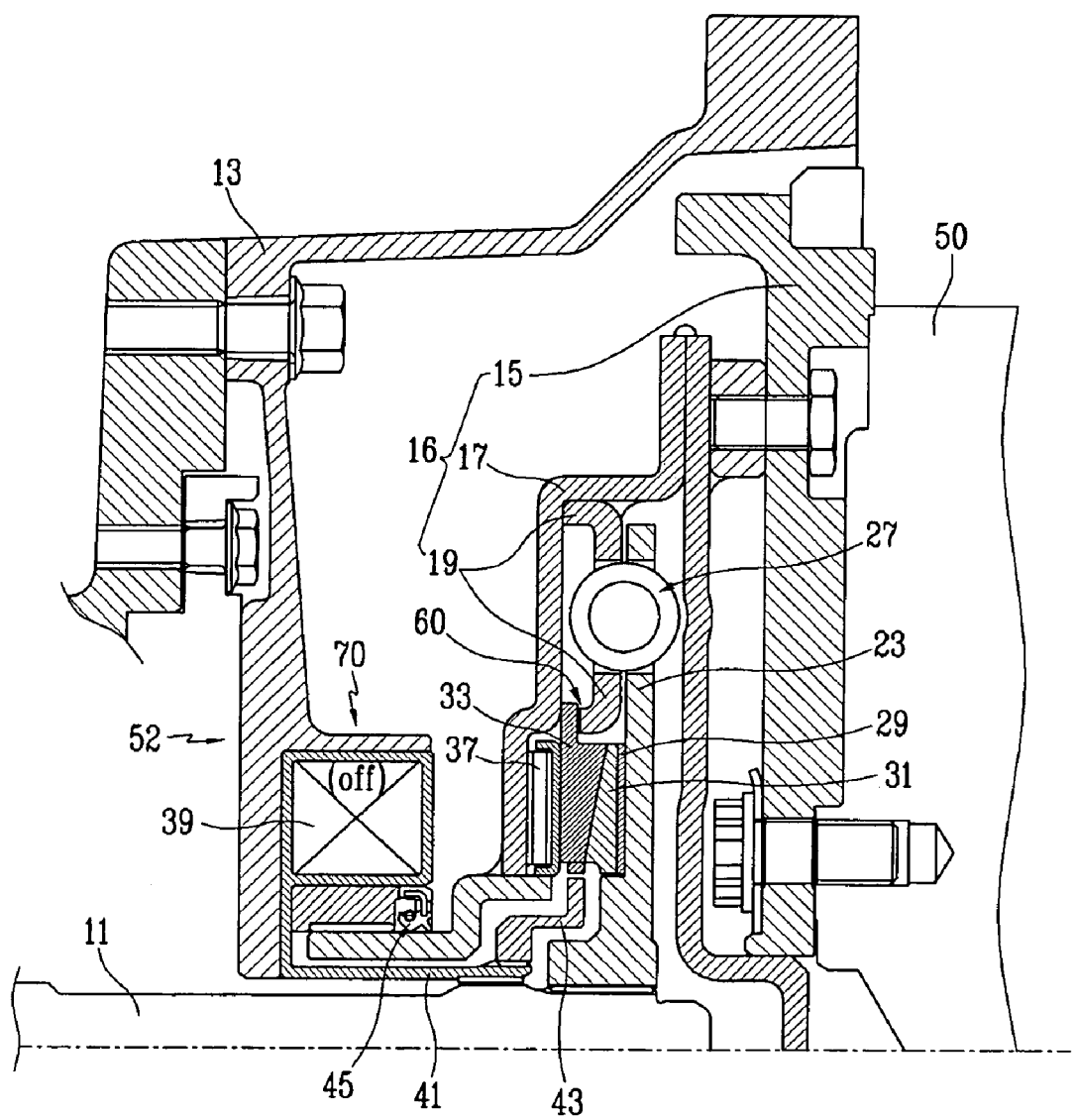
FIG. 1 and FIG. 2 show an "off" state according to an exemplary embodiment of the present invention.
Figure 2:
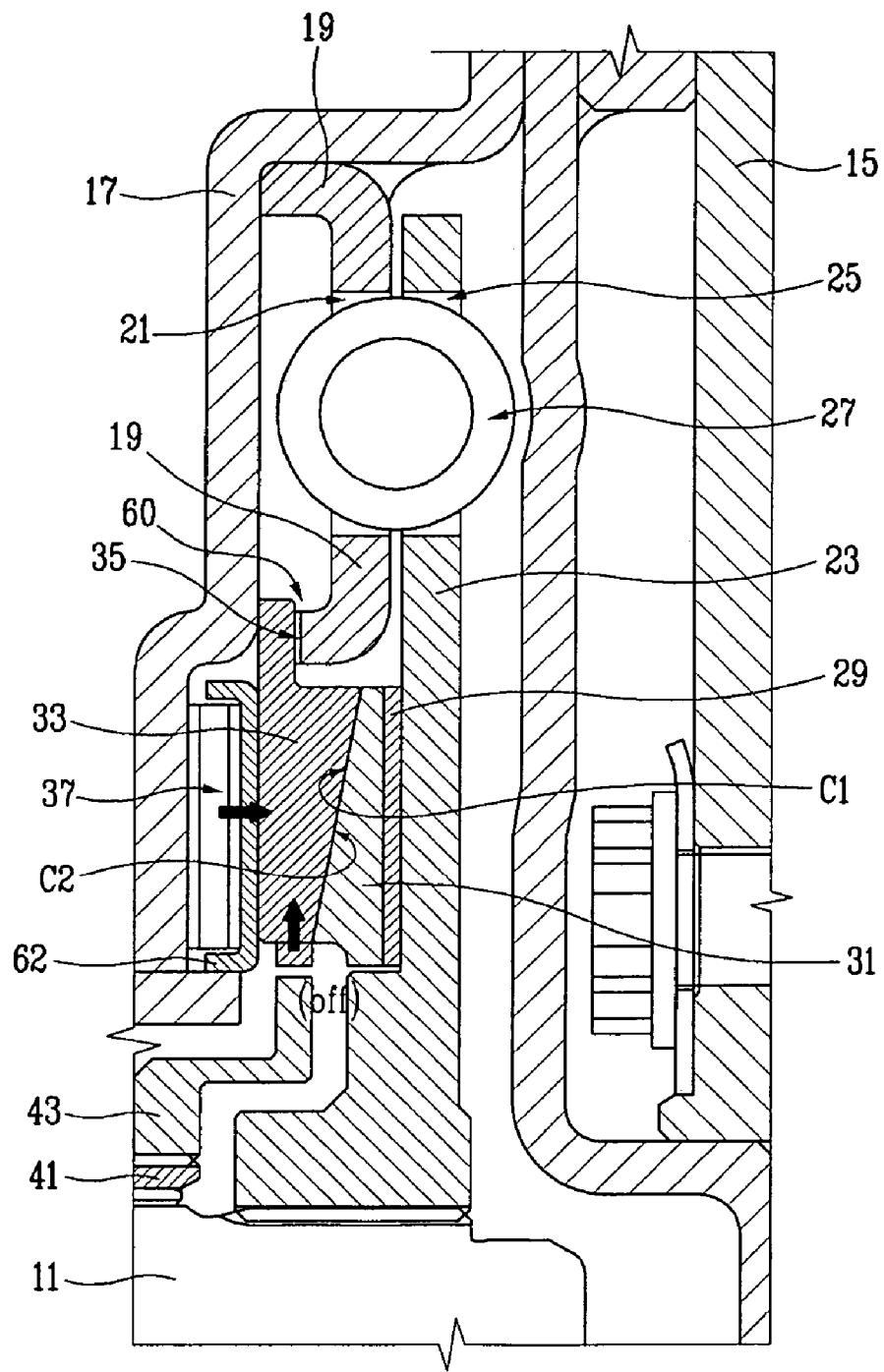

Referring to FIG. 1 and FIG. 2, according to the exemplary embodiment of the present invention, a variable damper includes a first plate 23, a second plate 16, a variable damper spring 27, and a variable friction apparatus 52.

The first plate 23 is connected to the first rotating shaft 11 to rotate with the first rotating shaft 11 as an integral body, and the second plate 16 is connected to the second rotating shaft 50 to rotate with the second rotating shaft 50 as an integral body.

The damper spring 27 transmits power between the first and second plates 23 and 16 by being pressed by relative rotation between the first plate 23 and the second plate 16.

The variable friction apparatus 52 variably regulates a frictional force between the first plate 23 and the second plate 16.

According to the exemplary embodiment of the present invention, the second rotating shaft 50 is a driving shaft and the first rotating shaft 11 is an anti-driving shaft. For example, the second rotating shaft 50 may be an output shaft of an engine of a vehicle, and the first rotating shaft 11 may be an input shaft of a transmission of a vehicle.

A damper cover 13 is disposed to the second rotating shaft 50 and does not rotate.

The second plate 16 includes a flywheel 15, a damper housing 17, and a retaining plate 19. As shown in FIG. 1, the flywheel 15, the damper housing 17, and the retaining plate 19 are sequentially connected to the second rotating shaft 50 in the damper cover 13. Therefore, if the second rotating shaft 50 rotates, the flywheel 15, the damper housing 17, and the retaining plate 19 of the second plate 16 rotate together.

The retaining plate 19 defines a plurality of spring inserting holes 21. In addition, the first plate 23 defines inserting holes 25 corresponding to the spring inserting holes 21 of the retaining plate 19.

If the second rotating shaft 50 rotates, the second plate 16 rotates and a torque is transmitted to the first plate 23 by the damper spring 27 mounted in the spring inserting holes 21 of the retaining plate 19.

The variable friction apparatus 52 includes a solenoid unit 70 and a friction unit 60. The solenoid unit 70 operates as an electromagnet by power supplied from outside and the friction unit 60 variably forms a frictional force between the first plate 23 and the second plate 16 according to the state of the solenoid unit 70.

That is, the torque is transmitted from the second plate 16 to the first plate 23 by the damper spring 27 and the frictional force between the first plate 23 and the second plate 16 is varied by the variable friction apparatus 52.

The friction unit 60 includes a pressure plate 31, a friction plate 29, a wedge 33, and an elastic member 37 and is disposed in the damper housing 17.

The pressure plate 31 forms a slanted surface C1 and the friction plate 29 is disposed between the pressure plate 31 and the second plate 16 to contact to the second plate 16.

The wedge 33 forms a slanted surface C2 and contacts to the pressure plate 31 to be movable along the slanted surface C1 corresponding to the operation of the solenoid unit 70.

The elastic member 37 elastically supports the wedge 33 in a direction toward the pressure plate 31 and the first plate 23.

As shown in FIG. 1 and FIG. 2, the first plate 23 contacts one surface of the friction plate 29 and the pressure plate 31 contacts to the other surface. The wedge 33 contacts the slanted surface C1 of the pressure plate 31 and the elastic member 37 is connected to the other surface of the pressure plate 31.

A cover 62 is mounted to the elastic member 37 and if the elastic member 37 applies an elastic force to the cover 62, the elastic force is transmitted to the wedge 33 (referring to the arrows in FIG. 2).

According to an exemplary embodiment of the present invention, the elastic member 37 includes a wave spring.

The wedge 33 is inserted to an inserting groove 35 formed to an inner end of the retaining plate 19 and rotates together with the retaining plate 19 and the damper housing 17.

That is, the slanted surface C2 of the wedge 33 and the slanted surface C1 of the pressure plate 31 contact each other and generate a frictional force.

The solenoid unit 70 includes a solenoid coil 39 and a solenoid pawl 43. The solenoid unit 70 generates a magnetic force by a supplied power and the solenoid pawl 43 operates as the electromagnet by the magnetic force.

In addition, the solenoid coil 39 is disposed to the damper cover 13 and is operated by a controller (not shown). The controller may comprise a processor, memory, and associated hardware, software and/or firmware as may be selected and programmed by a person of ordinary skill in the art based on the teachings of the present invention.

The solenoid coil 39 and the solenoid pawl 43 are electrically connected to each other by a core 41.

The solenoid pawl 43 is disposed to be selectively contacted to the inner end of the wedge 33. That is, if the solenoid coil 39 generates a magnetic force by the controller, the magnetic force is transmitted to the solenoid pawl 43 through the core 41.

Figure 3:
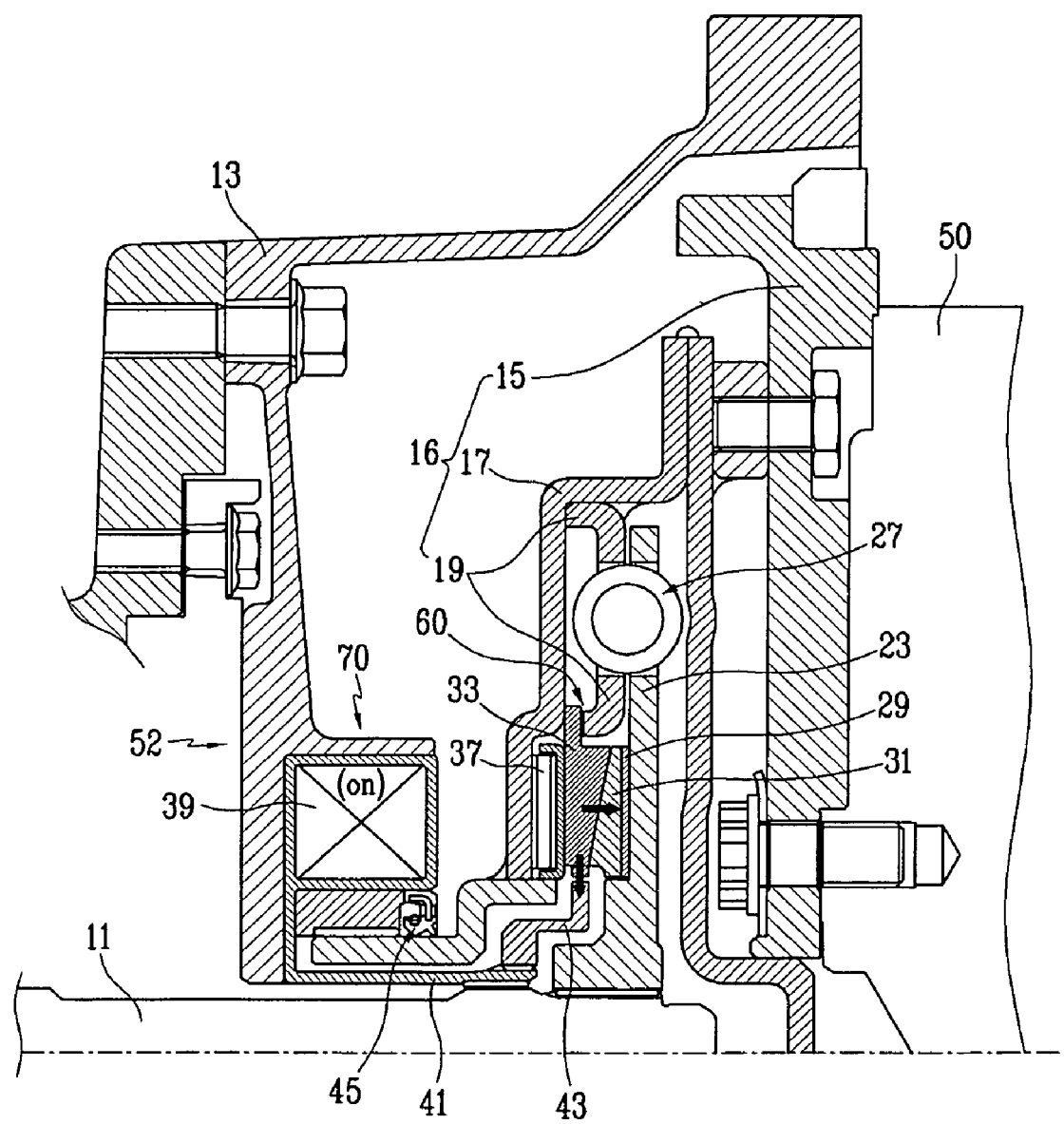
FIG. 3 and FIG. 4 show an "on" state according to the exemplary embodiment of the present invention.
Figure 4:
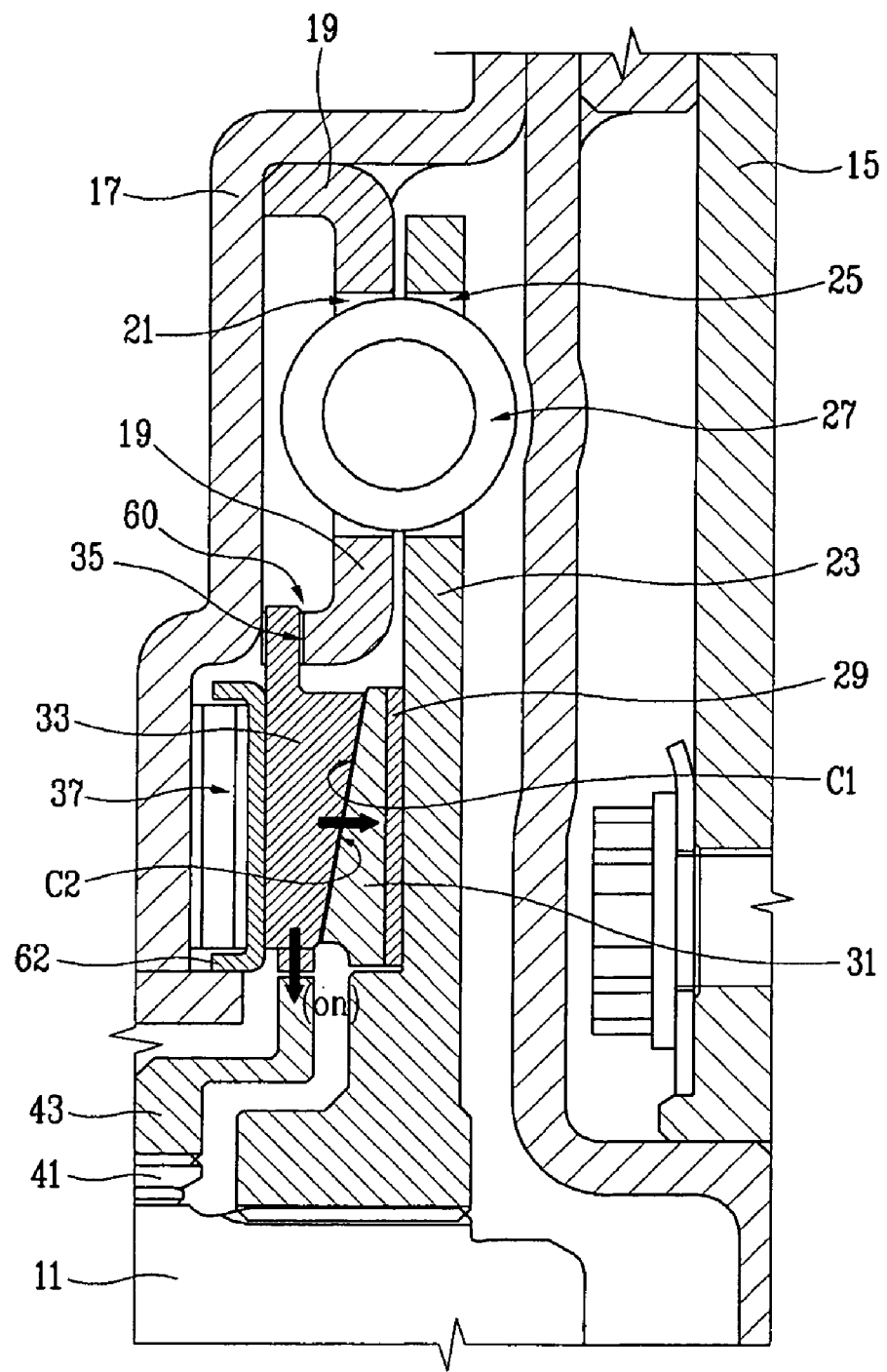

Referring to FIGS. 3 and 4, if the magnetic force is transmitted to the solenoid pawl 43 through the core 41, the solenoid pawl 43 operates as the electromagnet and the wedge 33 moves toward the solenoid pawl 43 (referring to arrows in FIG. 3 and FIG. 4).

That is, in a case that the solenoid coil 39 is turned on, the wedge 33 moves in the direction of the solenoid pawl 43 and simultaneously presses the elastic member 37.

In this case, the frictional force between the first plate 23 and the second plate 16 generated by the elastic member 37, that is, the frictional force between the wedge 33 and the pressure plate 31, increases.

Referring to FIG. 1, the solenoid pawl 43 may be splined to the core 41 in the damper cover 13.

The damper cover 13, the solenoid coil 39, and the core 41 do not rotate and so the solenoid pawl 43 does not either.

The wedge 33 is disposed to be apart from the solenoid pawl 43 at a constant distance and rotates.

Because the damper cover 13 does not rotate, an oil seal 45 may be disposed between the damper cover 13 and the damper housing 17.

Figure 5:
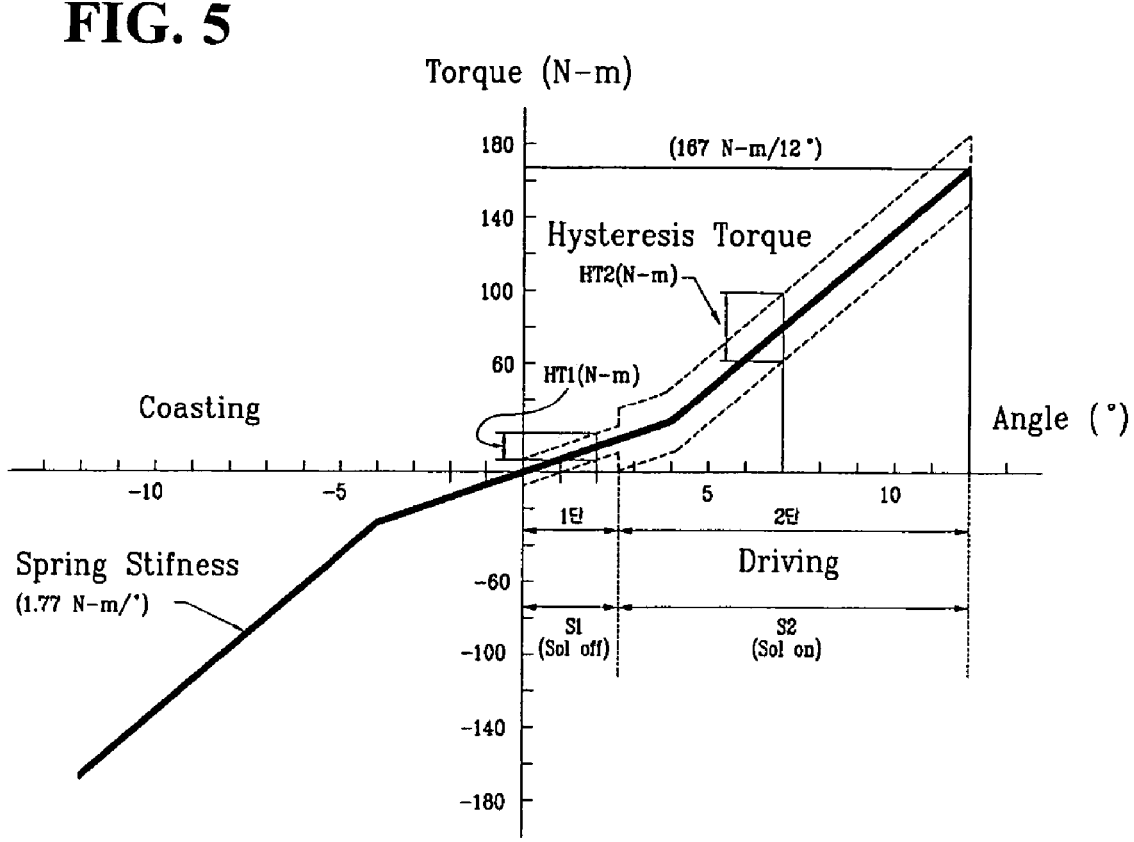
FIG. 5 shows a characteristic of a variable damper according to the exemplary embodiment of the present invention.

Referring to FIG. 5, a characteristic curve of the variable damper according to an exemplary embodiment of the present invention will be explained.

At a state where an engine is idle or a vehicle is in a low-speed running state S1, a low hysteresis torque HT1 is requested and at a state where the vehicle is accelerating or is running in full throttle and a hard deceleration running state S2, a high hysteresis torque HT2 is requested.

In a case where the low hysteresis torque HT1 is requested, as shown in FIG. 1 and FIG. 2, the controller cuts off a control signal transmitted to the solenoid coil 39. Therefore, the solenoid pawl 43 does not generate a magnetic force; therefore the friction damping force which determines the magnitude of the hysteresis torque is restricted only by the elastic force of the elastic member 37. The low hysteresis torque HT1 is thus generated.

If the high hysteresis torque HT2 is requested, as shown in FIG. 3 and FIG. 4, the controller magnetizes the solenoid coil 39 by transmitting a control signal to the solenoid coil 39. The solenoid pawl 43 pulls the wedge 33 downwards by generating a magnetic force and simultaneously a force acts on the slanted surface C1 of the pressure plate 31. That is, a vertical load acts on the friction plate 29 by the wedge 33. The damping frictional force is the same as a sum of the vertical load by the elastic member 37 and the vertical load acting on the pressure plate 31 by the magnetic force. The high hysteresis torque HT2 is thus generated.

The vertical load by the elastic force of the elastic member 37 may be determined by an experiment.

In addition, the controller can regulate a magnitude of the magnetic force by regulating a current flow in the solenoid coil 39. Therefore, the magnitude of the vertical load acting on the friction plate 29 can be regulated and a magnitude of the hysteresis torque can be regulated too. In other words, the hysteresis torque can be varied.

As described above, according to an exemplary embodiment of the variable damper of the present invention, because the value of the hysteresis torque is variably controlled, a booming noise can be prevented during the engine driving when the frequency passes the resonance range. In addition, a vibration from the engine can be effectively reduced in response to the vehicle condition.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A variable damper transmitting power between a first rotating shaft and a second rotating shaft, comprising,
   a first plate connected to the first rotating shaft to rotate together with the first rotating shaft;
   a second plate connected to the second rotating shaft to rotate together with the second rotating shaft as an integral body;
   a damper spring transmitting power between the first and second plates by being pressed by relative rotation between the first and second plates; and
   a friction regulating means for variably regulating a frictional force between the first plate and the second plate, wherein the friction regulating means comprises:
      a solenoid unit operating as an electromagnet and selectively being in either an "on" or an "off" state; and
      a friction forming means for forming a frictional force between the first plate and the second plate, said frictional force varying according to the state of the solenoid unit, wherein the friction forming means comprises:
         a pressure plate having a slanted surface;
         a friction plate disposed between the pressure plate and the second plate to contact the second plate;
         a wedge contacting the pressure plate and movable along the slanted surface according to the state of the solenoid unit; and
         an elastic member elastically supporting the wedge toward the pressure plate and the first plate.

2. The variable damper of claim 1, wherein the wedge moves in a direction that increases the frictional force between the wedge and the elastic member when the solenoid unit is in the "on" state.

3. The variable damper of claim 1, wherein the elastic member comprises a wave spring.

4. The variable damper of claim 1, wherein the solenoid unit comprises:
   a solenoid coil generating a magnetic force by the supplied power; and
   a solenoid pawl moving in response to the magnetic force.

* * * * *